(12) United States Patent
Satoh et al.

(10) Patent No.: US 6,407,024 B1
(45) Date of Patent: Jun. 18, 2002

(54) DIELECTRIC COMPOSITION AND CERAMIC CAPACITOR MADE FROM THE SAME

(75) Inventors: Shigeki Satoh; Yoshinori Fujikawa; Akiko Nagai; Kaori Masumiya, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/970,713

(22) Filed: Oct. 5, 2001

Related U.S. Application Data

(62) Division of application No. 09/481,505, filed on Jan. 12, 2000, now Pat. No. 6,335,302.

(30) Foreign Application Priority Data

Jan. 14, 1999 (JP) ................................. 11-8056

(51) Int. Cl.$^7$ ...................... C04B 35/468; C04B 35/465
(52) U.S. Cl. .................... 501/137; 501/139; 361/321.4; 361/321.5
(58) Field of Search ............................... 501/137, 138, 501/139; 361/321.4, 321.5

(56) References Cited

U.S. PATENT DOCUMENTS

| | | | |
|---|---|---|---|
| 4,889,837 A | * 12/1989 | Ono et al. | 501/139 |
| 5,219,811 A | * 6/1993 | Enomoto et al. | 501/138 |
| 5,296,425 A | * 3/1994 | Chazono et al. | 501/138 |
| 5,319,517 A | * 6/1994 | Nomura et al. | 361/321.4 |
| 5,635,436 A | * 6/1997 | Fukuda et al. | 501/138 |
| 6,074,970 A | * 6/2000 | Yamashita et al. | 501/138 |
| 6,139,780 A | * 10/2000 | Desu et al. | 252/584 |
| 6,335,302 B1 | * 1/2002 | Satoh et al. | 501/137 |

FOREIGN PATENT DOCUMENTS

JP A-3-97669 4/1991

* cited by examiner

*Primary Examiner*—David Brunsman
(74) *Attorney, Agent, or Firm*—Oliff & Berridge, PLC

(57) ABSTRACT

A dielectric composition containing at least calcium titanate, strontium titanate, and barium titanate, wherein at least the molar ratios of composition of the three are such that the molar ratio of composition (P) of calcium titanate is 0.5 to 0.85, the molar ratio of composition (Q) of strontium titanate is 0.05 to 0.4, and the molar ratio of composition (R) of barium titanate is 0.1 to 0.2 (where, P+Q+R=1).

25 Claims, 7 Drawing Sheets

DIELECTRIC COMPOSITION AND CERAMIC CAPACITOR MADE FROM THE SAME

This is a Division of application Ser. No. 09/481,505 now U.S. Pat. No. 6,335,302 filed Jan. 12, 2000. The entire disclosure of the prior application(s) is hereby incorporated by reference herein in its entirety.

BACKGROUND OF THE INVENTION

1. Field of the Invention

The present invention relates to a dielectric composition and a ceramic capacitor using the same, more particularly relates to a dielectric composition superior in resistance to reduction at the time of sintering, exhibiting a high dielectric constant and low distortion factor, and superior in the temperature-dependence of the capacity and to a ceramic capacitor having a high insulation resistance, high capacity, and low distortion characteristic, having a flat temperature-dependence of the capacity, and using a base metal for the internal electrodes.

2. Description of the Related Art

As a dielectric composition used for a ceramic capacitor, one having a high dielectric constant comprised mainly of barium titanate ($BaTiO_3$) is known, but since it is a strong dielectric, the nonlinear characteristic of the voltage is strong and the distortion factor originate from D-E hysterisys loop is a large −50 dB to −70 dB. Therefore, a $BaTiO_3$ based capacitor cannot be used for a capacitor for which a low distortion factor is required such as a coupling circuit capacity, audio circuit capacitor, or image processing circuit capacitor. Film capacitors, electrolytic capacitors, etc. are exclusively being used for these, but such film capacitors or electrolytic capacitors are hard to reduce in size and there are problems in surface mounting.

On the other hand, among the ceramic capacitors, ones comprised of ordinary dielectrics such as $CaTiO_3$, $SrTiO_3$, $CaSrZrO_3$, and $NdTiO_3$ are low in distortion factor and therefore can be used for coupling circuits, audio circuits, etc., but since they are ordinary dielectrics, the dielectric constant $\varepsilon r$ is a low 30 to 200 and obtaining a high capacity capacitor would be difficult.

Therefore, as a dielectric composition exhibiting both a high dielectric constant and low distortion factor, ones comprised mainly of $SrTiO_3$, $Bi_2TiO_3$, $CaTiO_3$, and $PbTiO_3$ have been proposed (for example, see Japanese Unexamined Patent Publication (Kekei) No. 3-97669).

Internal electrodes of a ceramic capacitor, however, use a precious metal such as platinum Pt, gold Au, Pd or silver Ag, and their alloy for example, Pt—Au, Ag—Pd but from the viewpoint of cost, nickel or another base metal is preferably used.

The above-mentioned dielectric composition contains bismuth Bi or lead Pb which have a low vapor pressure, so when sintered in a reducing atmosphere, these end up evaporating. Accordingly, while predicated on sintering in an oxidizing atmosphere, if sintered in an oxidizing atmosphere, when using a low cost base metal, for example, nickel, for the internal electrodes, the nickel ends up being oxidized. In the end, there is no choice but to use a precious metal such as platinum, gold, or silver for the internal electrodes.

SUMMARY OF THE INVENTION

An object of the present invention is to provide a dielectric composition superior in resistance to reduction at the time of sintering, exhibiting a high dielectric constant and low distortion factor, and superior in temperature-dependence of the capacity and a capacitor having a high insulation resistance, high capacity, and low distortion characteristic, having a flat temperature-dependence of the capacity, and using a base metal for the internal electrodes.

(1) The present inventors et al. engaged in in-depth research in order to obtain a balanced dielectric composition having a large dielectric constant, a small distortion factor, and a small rate of change of the capacity with respect to temperature (hereinafter referred to as a flat temperature-dependence of the capacity) and as a result obtained the following discoveries.

First, the distortion factor depends on the field dependency and non-linearity of the dielectric constant (that is, a strong dielectric property). As measures for suppressing the factor, it may be considered effective to improve the linearity of the dielectric constant or reduce the crystalline anistrophy so as to reduce the strong dielectric property or to use an ordinary dielectric phase. If the strong dielectric property is reduced, however, the dielectric constant falls, so balancing these becomes important. Further, an ordinary dielectric exhibits a negative temperature-dependence of the capacity, while a strong dielectric exhibits a positive temperature-dependence of the capacity, so balancing the strong dielectric and the ordinary dielectric becomes important for the temperature-dependence of the capacity as well.

The balance of the dielectric constant, distortion factor, and temperature-dependence of the capacity becomes suitable by controlling the molar ratios of composition of the calcium titanate, strontium titanate, and barium titanate. In the present invention, by adding the strong dielectric barium titanate to the ordinary dielectric calcium titanate (or strontium titanate), the balance of the ordinary dielectric phase and strong dielectric phase is promoted and it is possible to obtain a dielectric composition having a large dielectric constant, a small distortion factor, and a flat temperature-dependence of the capacity.

That is, if the molar ratio of composition of barium titanate is increased, while the dielectric constant becomes larger, the distortion factor and the rate of change of the capacity with respect to the temperature also become larger. As opposed to this, if the molar ratio of composition of strontium titanate is increased, while the distortion factor becomes smaller, the dielectric constant also becomes smaller. Further, when the molar ratio of composition of calcium titanate is increased too, while the distortion factor becomes small, the dielectric constant also becomes small.

Further, comparing calcium titanate and strontium titanate, if the molar ratio of composition of calcium titanate is increased, the rate of change of capacity with respect to temperature becomes smaller, but the dielectric constant also becomes smaller. As opposed to this, if the molar ratio of composition of strontium titanate is increased, the dielectric constant becomes larger, but the rate of change of the capacity with respect to temperature also becomes larger.

(2) Based on this discovery, the first aspect of the invention provides a dielectric composition containing at least calcium titanate, strontium titanate, and barium titanate, wherein the molar ratios of composition of the three are such that at least a molar ratio of composition of the barium titanate is not more than 0.3 and wherein the composition comprised of the calcium titanate, strontium titanate, and barium titanate contains at least one crystal structure from among tetragonal and orthorhombic crystal structures.

The composition comprising calcium titanate, strontium titanate, and barium titanate exhibits an insoluble phase and cubic crystal structure as well due to these three ratios of composition, but ratios of composition exhibiting mainly an insoluble phase are not desirable since the distortion factor is large, while ratios of composition exhibiting mainly a cubic crystal structure is not desirable since the distortion factor is large and the rate of change of the capacity with respect to the temperature is also large.

Further, a cubic crystal structure is exhibited in the region where the barium titanate is rich, but in this region, the molar ratio of composition of the barium titanate is large, so the dielectric constant becomes large, but the distortion factor also becomes large and the balance between the dielectric constant and the distortion factor is poor. Therefore, a tetragonal crystal structure in the region where the molar ratio of composition of barium titanate is not more than 0.3 is more preferable.

In the above aspect of the invention, the crystal structure of the dielectric composition obtained is not one which is completely comprised of at least one of a tetragonal crystal and orthorhombic crystal structure. It means the main crystal structure is at least one of a tetragonal crystal and orthorhombic crystal structure. Therefore, inclusion of an insoluble phase or cubic crystal structure etc. in part of it is also included in the technical scope of the present invention.

In particular, when the calcium titanate, strontium titanate, and barium titanate are in ratios of composition of an area near the transition point between a tetragonal crystal structure and orthorhombic crystal structure, the balance between the dielectric constant and distortion factor of course and also the temperature-dependence of the capacity (temperature coefficient) become good.

(3) Further, a second aspect of the present invention provides a dielectric composition containing at least calcium titanate and barium titanate, wherein when the calcium titanate is CT and the barium titanate is BT, $$(CT)_x(BT)_y(F)_{1-x-y}$$

(where F is any component)

are satisfied (see FIG. 2). Note that the third component F is not particularly limited.

By controlling the ratios of composition of the ordinary dielectric calcium titanate and the strong dielectric barium titanate, it is possible to promote the balance of the ordinary dielectric phase and strong dielectric phase and obtain a dielectric composition having a large dielectric constant, a small distortion factor, and a flat temperature-dependence of the capacity.

If the molar ratio of composition (y) of the barium titanate is large, the dielectric constant becomes large, but the distortion factor also becomes large, so to obtain a balance between the dielectric constant and the distortion factor, it is more preferable that $0<y\leq 0.2$. Further, if the molar ratio of composition (x) of the calcium titanate is small, the dielectric constant becomes large, but the rate of change of the capacity with respect to the temperature also becomes large (temperature-dependence of the capacity deteriorates), so to obtain a balance between the dielectric constant and the temperature-dependence of the capacity, it is more preferable that $0.4\leq x<1$.

(4) A third aspect of the present invention provides a dielectric composition containing at least calcium titanate, strontium titanate, and barium titanate, where at least the three molar ratios of composition are such that the molar ratio of composition (P) of calcium titanate is 0.5 to 0.85, the molar ratio of composition (Q) of strontium titanate is 0.05 to 0.4, and the molar ratio of composition (R) of barium titanate is 0.1 to 0.2 (however, P+Q+R=1) (see FIG. 3).

By adding the strong dielectric barium titanate to the ordinary dielectrics calcium titanate and strontium titanate, the balance of the ordinary dielectric phase and strong dielectric phase is promoted and it is possible to obtain a dielectric composition having a large dielectric constant, a small distortion factor, and a flat temperature-dependence of the capacity.

If the molar ratio of composition (P) of the calcium titanate is small, the dielectric constant becomes large, but the rate of change of capacity with respect to temperature also tends to become large (temperature-dependence deteriorates). Further, if the molar ratio of composition (Q) of the strontium titanate is large, both the distortion factor and the rate of change of capacity with respect to temperature tend to become large. Further, if the molar ratio of composition (R) of the barium titanate is large, the dielectric constant becomes large, but the distortion factor also tends to become large. Therefore, to obtain a balance of the dielectric constant, distortion factor, and temperature-dependence of the capacity, it is preferable that $0.55\leq P\leq 0.8$, $0.2\leq Q\leq 0.35$, and $0.12\leq R\leq 0.18$, in particular that the region be near the transition point between the tetragonal crystal and orthorhombic crystal structures.

(5) Note that in the second and third aspects of the invention, it is preferable that the dielectric composition include at least one crystal structure from a tetragonal crystal and orthorhombic crystal structure. Ratios of composition exhibiting mainly an insoluble phase are not preferable since the distortion factor becomes large, while ratios of composition exhibiting mainly a cubic crystal structure is not preferable since the rate of change of capacity with respect to temperature also becomes large.

(6) The first to third aspects of the invention explained above may also contain various additives.

(6-1) As the type of additives, MnO, CrO, and other reduction resistance aids may be mentioned. These reduction resistance aids have the effect of promoting sintering and the effect of improving the insulation resistance ($I_R$), but if added in large amounts, the insulation resistance, dielectric loss (tanδ), and distortion factor deteriorate, so the amount is preferably made 0.1 to 1 mol %.

(6-2) Further, as other additives, a glass composition or other sintering aid may be mentioned.

As a sintering aid preferably used in the present invention, at least one type of glass composition selected from the G group of $SiO_2$ and $Al_2O_3$, M group of BaO, CaO, and SrO, and L group of $Li_2O$, $Na_2O$, $K_2O$, and $B_2O_3$ may be mentioned.

In the dielectric composition of the present invention, if the sintering temperature is not more than 1340° C., a sufficient sintered body cannot be obtained. If sintered at under this temperature, a reduction in the dielectric constant and a reduction in the insulation resistance IR occur and the distortion factor increases. On the other hand, the additives $SiO_2$, $Al_2O_3$, $V_2O_5$, $MoO_3$, $WO_3$, and $Co_3O_4$ have the side effect of causing a reduction in the sintering temperature, but if the amounts added are increased, have the defect of causing a reduction in the insulation resistance IR. In general, lowering the sintering temperature has the effect of improving the cover rate of the internal electrodes, the effect of suppressing their becoming too thick, and other defects and the effect of suppressing the oxidation and dispersion of the internal electrodes. Therefore, by adding a sintering aid as in the present invention, the state of the internal electrodes becomes good and the reliability of the break down voltage etc. are improved. Further, there is not that much of an effect on the temperature-dependence of the capacity by the addition of the sintering aid.

When added in a large amount, however, unevenness occurs in the sintering ability and the insulation resistance and distortion factor deteriorate, while when too little is added, the effect of low temperature sintering is lost, so a range of 0.2 to 5 mol % is preferable.

When using at least one type of glass composition selected from the above G group, M group, and L group as the sintering aid, preferably, when the ratios of composition of the G group, M group, and L group are expressed by a triangular diagram (G, M, and L), the ratio of composition of the sintering aid is in the area surrounded by the following points X1 to X5 (including on lines):

X1: (0.0, 0.0, 1.0)
X2: (0.0, 0.5, 0.5)
X3: (0.1, 0.65, 0.25)
X4: (0.5, 0.0, 0.5)
X5: (0.65, 0.05, 0.3)

Further, more preferably, when the ratios of composition of the G group, M group, and L group are expressed by a triangular diagram, the ratio of composition of the sintering aid is in the area surrounded by the following points X1, X6, X7, and X5 (including on lines):

X1: (0.0, 0.0, 1.0)
X6: (0.0, 0.2, 0.8)
X7: (0.3, 0.4, 0.3)
X5: (0.5, 0.0, 0.5)

(6-3) As other additives, it is possible to mention at least one oxide selected from $V_2O_5$, $MoO_3$, $WO_3$, and $Co_3O_4$. These have the effect of lowering the sintering temperature and lowering the distortion factor. Among these, $V_2O_5$ is most preferable. If these are added in large amounts, the insulation resistance and the dielectric loss remarkably deteriorate, so it is preferable to add them in the range of 0.01 to 0.5 mol %.

(6-4) Further, as other additives, it is possible to mention at least one oxide selected from $Nb_2O_5$, $Ta_2O_5$, $Y_2O_3$, $La_2O_3$, $CeO_2$, $Gd_2O_3$, $Dy_2O_3$, and $Ho_2O_3$. These have the effect of improving the dielectric loss and reducing the distortion factor. These are preferably added in the range of 0.01 to 0.2 mol %.

(7) The dielectric composition according to the above present invention is preferably used as a material of the dielectric layer of a ceramic capacitor having internal electrodes and the dielectric layer.

In this case, the internal electrodes are more preferably comprised by Ni or an Ni alloy. A dielectric composition according to the present invention is superior in reduction resistance, so can be sintered in a reducing atmosphere, can use Ni or an Ni alloy for the internal electrodes, and can be reduced in cost.

Note that the structure of the ceramic capacitor etc. is not particularly limited and includes not only a stacked type capacitor, but also a single sheet type capacitor.

BRIEF DESCRIPTION OF THE DRAWINGS

Embodiments of the present invention will be explained below based on the drawings.

DESCRIPTION OF THE PREFERRED EMBODIMENTS

Figure 1:
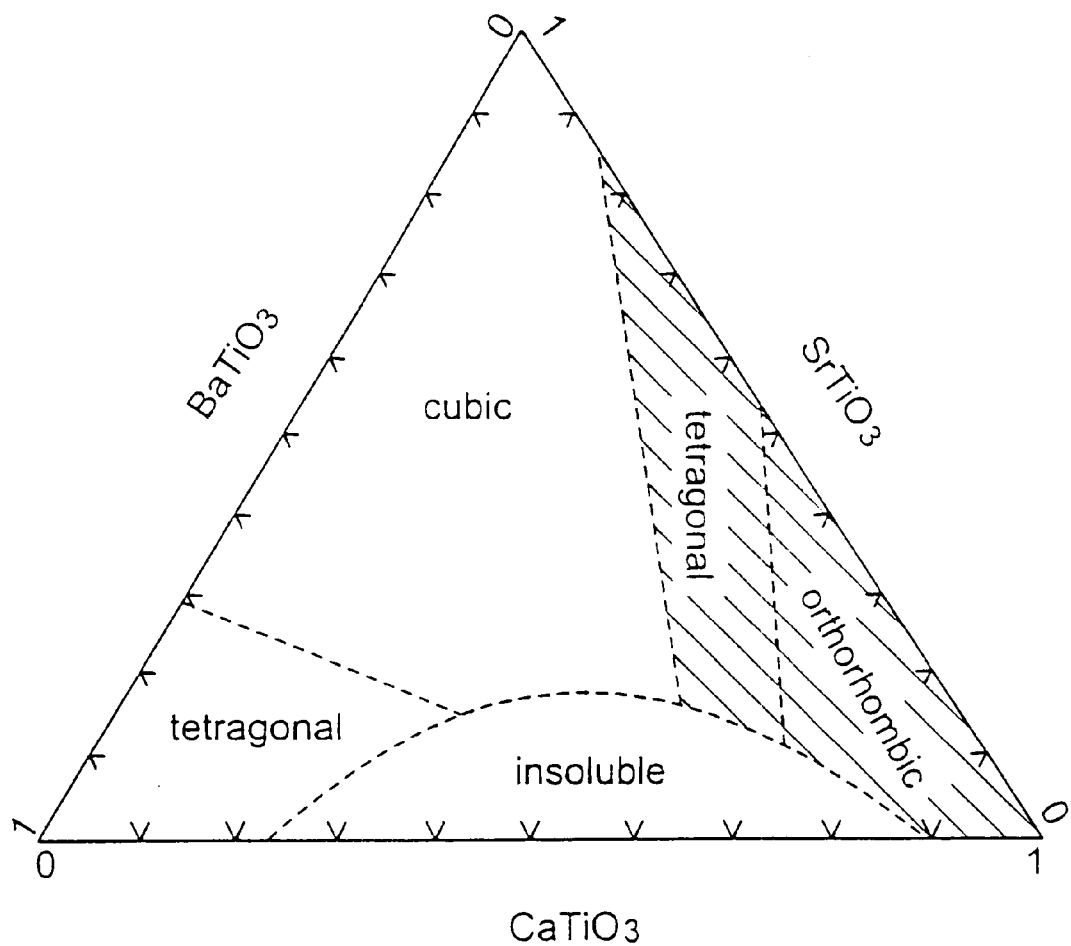
FIG. 1 is a view of the three-way composition of the main ingredients of a dielectric composition of the present invention.
Figure 2:
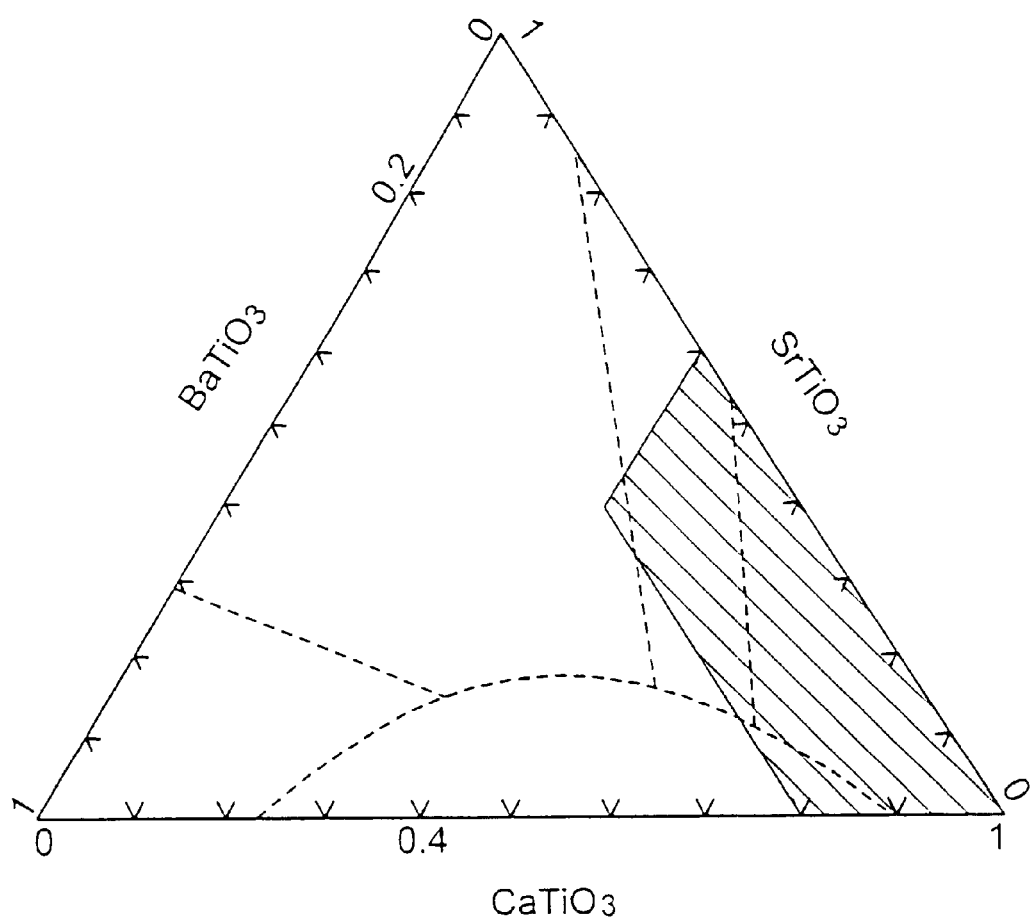
FIG. 2 is a view of the three-way composition of the main ingredients of a dielectric composition of the present invention.
Figure 3:
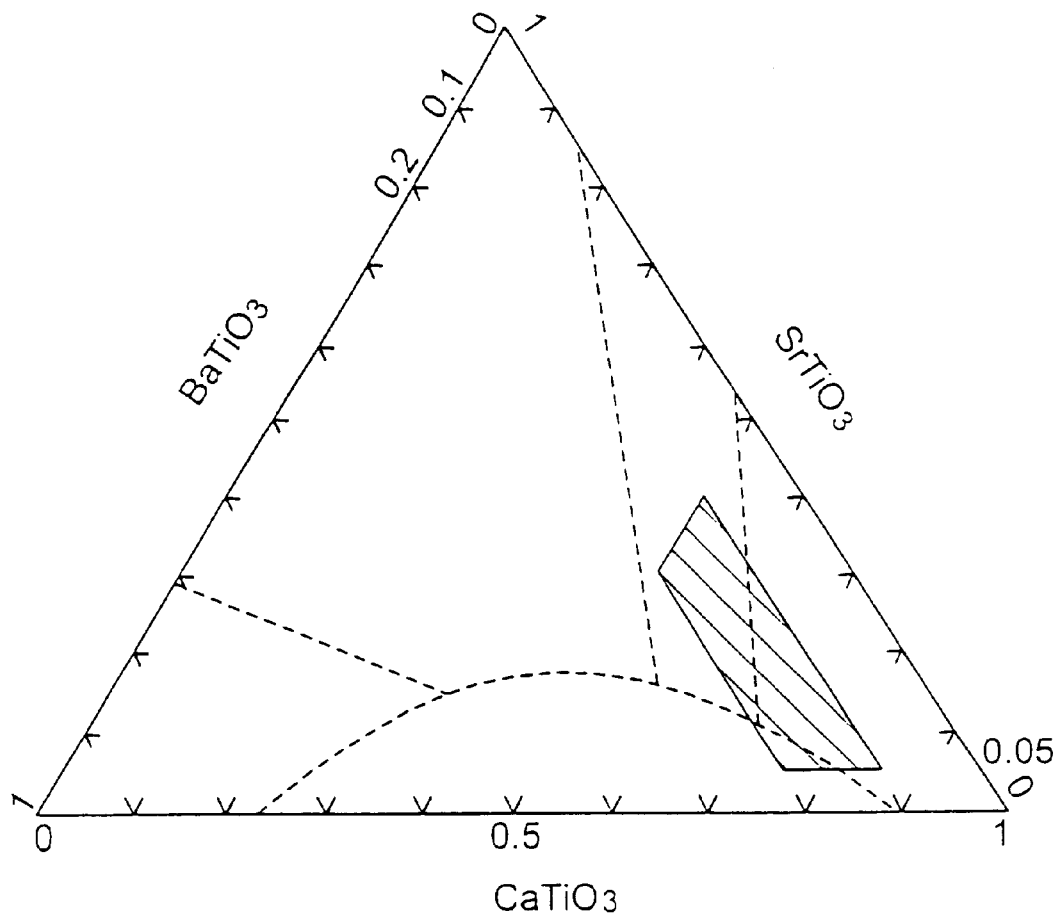
FIG. 3 is a view of the three-way composition of the main ingredients of a dielectric composition of the present invention.
Figure 4:
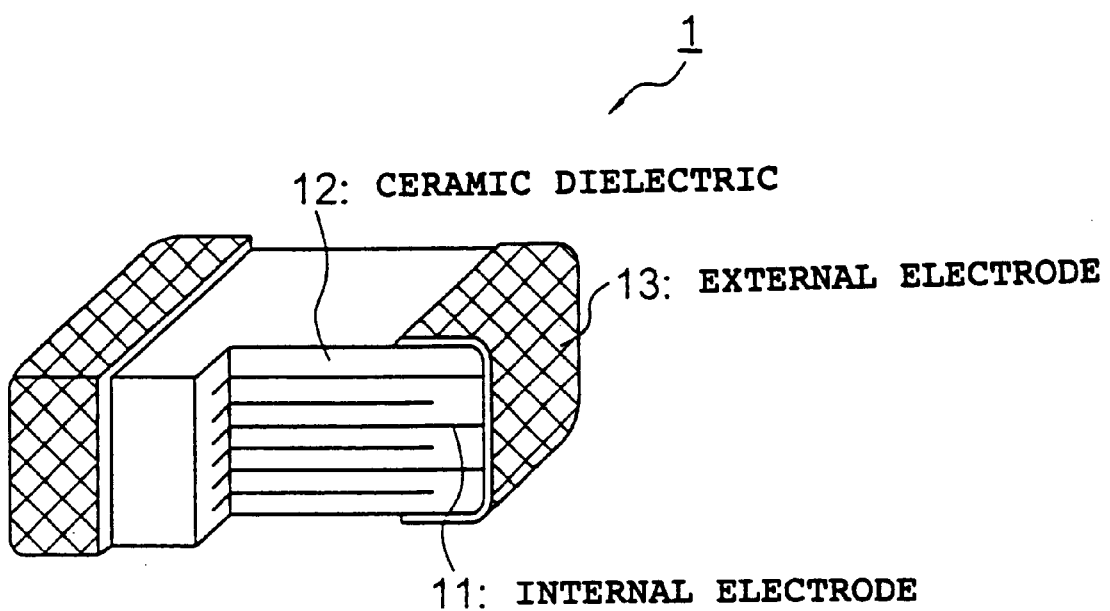
FIG. 4 is a partially cutaway perspective view of an embodiment of a capacitor of the present invention.

The stacked type ceramic capacitor 1 shown in FIG. 4 is comprised of internal electrodes 11 and dielectric layers 12 alternately stacked and a pair of external electrodes 13 connected to the internal electrodes.

In this example, the internal electrodes 11 are formed from nickel or a nickel alloy. While not particularly limited, as the nickel alloy, an alloy of at least 95 wt % of nickel with at least one of manganese, chrome, cobalt, aluminum, etc. is preferable. Further, the nickel or nickel alloy may contain as trace ingredients not more than 0.1 wt % of phosphorus etc.

The thickness and other conditions of the internal electrodes 11 should be suitably determined in accordance with the object and application, but ordinarily the thickness is 1 to 5 $\mu$m, particularly 2 to 3 $\mu$m.

The material of the dielectric layer 12 contains calcium titanate, strontium titanate, and barium titanate. The molar ratios of composition of these three are as explained above. Such a composition has a perovskite ($ABO_3$) structure. The A/B (molar ratio) depends on the quality of the material, but the characteristics are sufficiently satisfied if the ratio is in the range of 0.99 to 1.02.

Further, the dielectric composition preferably has added to it 0.1 to 1 mol % of a reduction resistance aid such as MnO or $Cr_2O_3$, 0.2 to 5 mol % of a sintering aid of at least one type of glass composition selected from a G group of $SiO_2$ and $A_2O_3$, an M group of BaO, CaO, and SrO, and an L group of $Li_2O$, $Na_2O$, $K_2O$, and $B_2O_3$, 0.01 to 0.5 mol % of at least one type of oxide selected from $V_2O_5$, $MoO_3$, $WO_3$, and $Co_3O_4$, and 0.01 to 0.2 mol % of at least one type of oxide selected from $Nb_2O_5$, $Ta_2O_5$, $Y_2O_3$, $La_2O_3$, $CeO_2$, $Gd_2O_3$, $Dy_2O_3$, and $Ho_2O_3$.

Note that for the external electrodes 13, ordinary copper or copper alloy, nickel or a nickel alloy, etc. may be used, but it is also possible to use silver, an alloy of silver and palladium, etc. The external electrodes 13 may be of any thickness. This should be suitably determined in accordance with the object and application, but ordinarily is 10 to 50 $\mu$m.

Further, the shape and size of the stacked type ceramic capacitor 1 should be suitably determined in accordance with the object and application. For example, in the case of a parallelopiped, the dimensions are ordinarily 1.6 to 3.2 mm×0.8 to 1.6 mm×0.6 to 1.2 mm.

The stacked type ceramic capacitor 1 of the present embodiment may be fabricated as follows:

First, a dielectric layer paste, internal electrode paste, and external electrode paste are produced.

The dielectric layer paste is produced by kneading a dielectric material in accordance with the composition of the above dielectric composition with an organic vehicle or by making a water soluble coating agent. The dielectric material may be suitably selected from various compounds comprised of the above composite oxides or oxides, for example, carbonates, nitrates, hydroxides, organic metal compounds, etc. and mixed for use. The content of the compounds in the dielectric material should be determined to give the above composition of the dielectric layer after sintering. The dielectric material is ordinarily used as a powder of an average particle size of 0.1 to 3.0 µm or so.

The organic vehicle comprises a binder dissolved in an organic solvent. The binder used for the organic vehicle is not particularly limited and may be suitably selected from various types of ordinary binders such as ethyl cellulose and polyvinyl butyral. Further, the organic solvent used at this time is not particularly limited either and should be suitably selected from organic solvents such as terpineol, butyl carbitol, acetone, and toluene in accordance with the method of use such as a printing method or sheet method.

Further, the Aqueous binder system is comprised of water in which a water soluble binder, dispersant, etc. are dissolved. The water soluble binder is not particularly limited and should be suitably selected from polyvinyl alcohol, cellulose, a water soluble acrylic resin, an emulsion, etc.

The internal electrode paste is prepared by mixing conductive materials comprised of the above various types of conductive metals or alloys or various oxides forming the above conductive materials after sintering, organic metal compounds, resinates, etc., and the above organic vehicles. Further, the external electrode paste can also be prepared in the same way as the internal electrode paste.

The content of the organic vehicle of the above pastes is not particularly limited, but may be made the ordinary content, for example, about 1 to 5 wt % of a binder and about 10 to 50 wt % of a solvent. Further, the pastes may contain, in accordance with need, additives selected from various dispersants, plasticizers, dielectrics, insulators, etc.

When using the printing method, the dielectric paste and the internal electrode paste are screen printed on a substrate of polyethylene terephthalate. The substrate is cut to predetermined shapes, then the pastes peeled off from the substrate pieces to obtain green chips. As opposed to this, when using the sheet method, a dielectric paste is used to form a green sheet, the internal electrode paste is printed on it, then these are stacked to obtain green chips.

Next, the green chips are processed to remove the binder and sintered. The processing for removing the binder is performed before the sintering and may be performed under ordinary conditions, but when using nickel or a nickel alloy or other base metal as the conductive material of the internal electrode layer, the conditions may be made an air atmosphere, a rate of temperature rise of 5 to 300° C./hour, more preferably 10 to 100° C./hour, a holding temperature of 180 to 400° C., more preferably 200 to 300° C., and a temperature holding time of 0.5 to 24 hours, more preferably 5 to 20 hours.

The sintering atmosphere of the green chips should be suitably determined in accordance with the type of the conductive material in the internal electrode paste, but when using nickel or a nickel alloy or other base metal as the conductive material, the oxygen partial pressure in the sintering atmosphere is preferably made $1 \times 10^{-8}$ to $1 \times 10^{-12}$. If the oxygen partial pressure is too low, the conductive material of the internal electrodes causes abnormal sintering and ends up breaking, while if the oxygen partial pressure is too high, the internal electrodes end up being oxidized. Further, the holding temperature during sintering is 1100 to 1400° C., more preferably 1200 to 1380° C. If the holding temperature is too low, the densification is insufficient, while if the holding temperature is too high, the electrodes break due to the abnormal sintering of the internal electrodes and the temperature-dependence of the capacity deteriorates due to the dispersion of the material of the internal electrodes.

As the other sintering conditions, the rate of temperature rise is preferably made 50 to 500° C./hour, more preferably 200 to 300° C./hour, the temperature holding time is preferably made 0.5 to 8 hours, more preferably 1 to 3 hours, the cooling rate is made 50 to 500° C./hour, more preferably 200 to 300° C./hour, and the sintering atmosphere is made a reducing atmosphere. As the atmospheric gas, it is preferable to use a wet mixed gas of for example nitrogen gas and hydrogen gas.

When sintering in a reducing atmosphere, it is preferable to anneal the sintered capacitor chips. The annealing is processing for reoxidizing the dielectric layer. This enables the insulation resistance to be increased. The oxygen partial pressure of the annealing atmosphere is preferably made at least $1 \times 10^{-6}$ atmospheres, more preferably $1 \times 10^{-5}$ to $1 \times 10^{-4}$ atmospheres. If the oxygen partial pressure is too low, reoxidation of the dielectric layer becomes difficult, while if the oxygen partial pressure is too high, the internal electrodes are liable to be oxidized. The holding temperature at the time of annealing is not more than 1100° C., more preferably 500 to 1100° C. If the holding temperature is too low, reoxidation of the dielectric layer becomes insufficient, the insulation resistance deteriorates, and the accelerated life also becomes shorter. Further, if the holding temperature is too high, not only will the internal electrodes oxidize and the capacity fall, but also the dielectric base material will end up being reacted with and the temperature-dependence of the capacity, insulation resistance, and accelerated life will deteriorate. Note that the annealing may also be comprised of only a temperature raising process and a temperature lowering process. In this case, the temperature holding time becomes zero and the holding temperature becomes synonymous with the maximum temperature.

The other annealing conditions are a temperature holding time of 0 to 20 hours, more preferably 6 to 10 hours, a cooling rate of 50 to 500° C./hour, more preferably 100 to 300° C./hours, and an atmospheric gas of the annealing of for example wet nitrogen gas.

Note that in the processing for removal of the binder, the sintering, and the annealing process, it is for example possible to use a wetter etc. to wet the nitrogen gas or mixed gas. The water temperature in this case is preferably made 5 to 75° C.

The processing for removing the binder, sintering, and annealing may be performed consecutively or independently. When performing these consecutively, preferably, after the processing for removing the binder, the atmosphere is changed without cooling, then the temperature is raised to the holding temperature for the sintering, the sintering performed, then the chips are cooled, the atmosphere is changed when the holding temperature of the annealing is reached, and then annealing is performed.

On the other hand, when performing these independently, at the time of sintering, preferably the temperature is raised to the holding temperature at the time of the processing for removing the binder in a nitrogen gas or wet nitrogen gas atmosphere, then the atmosphere is changed and the temperature is further raised. Preferably, the chips are cooled to the holding temperature of the annealing, then the atmosphere changed again to a nitrogen gas or wet nitrogen gas atmosphere and the cooling continued. Further, at the time of annealing, the temperature may be raised to the holding temperature in a nitrogen gas atmosphere, then the atmosphere changed or the entire annealing process may be performed in a wet nitrogen gas atmosphere.

The thus obtained sintered capacitors are for example end polished by barrel polishing or sandblasting etc., then printed or transferred with an external electrode paste and sintered to form the external electrodes. The sintering conditions of the external electrode paste are for example preferably 600 to 800° C. for 10 minutes to 1 hour or so in a wet mixed gas of nitrogen and hydrogen. Further, in accordance with need, the surfaces of the external electrodes may be formed with a covering layer by plating etc.

A thus produced ceramic capacitor 1 of the present embodiment is mounted by soldering on to a printed circuit board for use for various types of electronic equipment.

Specific embodiments of the present invention will be given below to explain the present invention in further detail. In the following embodiments, the characteristics of the dielectric composition of the present invention itself and the characteristics of a stacked type ceramic capacitor having this as a dielectric layer were evaluated.

Fabrication of Dielectric Composition

Powdered materials of a particle size of 0.1 to 1 $\mu$m comprised of barium titanate $BaTiO_3$, strontium titanate $SrTiO_3$, calcium titanate $CaTiO_3$, manganese oxide MnO, silicon dioxide $SiO_2$ vanadium oxide $V_2O_5$, and, in accordance with need, rare earth oxides (at least one type of oxide selected from $Nb_2O_5$, $Ta_2O_5$, $Y_2O_3$, $La_2O_3$, $CeO_2$, $Gd_2O_3$, $Dy_2O_3$, and $Ho_2O_3$) were wet-mixed for 16 hours by a ball mill. The result was then dried to obtain the dielectric material.

The matrix barium titanate $BaTiO_3$, strontium titanate $SrTiO_3$, and calcium titanate $CaTiO_3$ were prepared by respectively weighing $BaCO_3$, $CaCO_3$, $SrCO_3$, and $TiO_2$, wet-mixing them for 16 hours using a ball mill, drying them, then sintering in air at a temperature of 1150° C. and wet pulverizing the result by a ball mill for 50 hours.

Note that the barium titanate $BaTiO_3$, strontium titanate $SrTiO_3$, and calcium titanate $CaTiO_3$ give similar characteristics even when using materials prepared by hydrothermally synthesized powder, the oxalate method, etc.

The samples used for measurement were obtained by adding 0.05 wt % of polyvinyl alcohol as a binder to the above dielectric composition and mixing the binder and the dielectric composition to form granules. Next, 0.3 g of the granular dielectric composition was weighed and press formed to a disk of an outer diameter of 12 mm and a thickness of 0.5 mm.

The shaped article was processed to remove the binder under conditions of a rate of temperature rise of 300° C./hour, a holding temperature of 800° C., a holding time of 2 hours, and an air and wet nitrogen gas atmosphere ($1\times10^{-5}$ atm).

Next, the shaped article was sintered under conditions of a rate of temperature rise of 200° C./hour, a holding temperature of 1380° C., a holding time of 2 hours, a cooling rate of 300° C./hour, and a mixed gas atmosphere of wet nitrogen gas and hydrogen gas ($1\times10^{-9}$ atm) to obtain a sintered body of an outer diameter of about 10 mm and a thickness of 0.5 mm. Further, the sintered body was annealed under conditions of a holding temperature of 900° C., a holding time of 9 hours, a cooling rate of 300° C./hour, and a wet nitrogen gas atmosphere ($1\times10^{-5}$ atm). Note that the atmospheric gases may be wet using a wetter and a water temperature of 35° C.

In—Ga is coated on the two sides of the disk shaped sintered body obtained in this way to form electrodes of ø6 mm. This was used as the sample of the dielectric composition (hereinafter also referred to as the "disk-shaped sample") and was measured for ceramic characteristics, dielectric constant, dielectric loss, and temperature-dependence of the capacity.

Fabrication of Multilayer Ceramic Capacitor

In parallel with this, a multilayer ceramic capacitor was fabricated.

First, for the dielectric layer paste, 100 wt % of various dielectric materials, 4.8 wt % of acrylic resin, 40 wt % of methylene chloride, 20 wt % of ethyl acetate, 6 wt % of mineral spirits, and 4 wt % of acetone were mixed by a ball mill to make a paste.

For the internal electrode paste, 100 wt % of nickel particles of an average particle size of 0.2 to 0.8 $\mu$m, 40 wt % of an organic vehicle (8 wt % of ethyl cellulose resin dissolved in 92 wt % of butyl carbitol), and 10 wt % of butyl carbitol were kneaded by a triple roll to form a paste.

For the external electrode paste, 100 wt % of copper particles of an average particle size of 0.5 $\mu$m, 35 wt % of an organic vehicle (8 wt % of ethyl cellulose dissolved in 92 wt % of butyl carbitol), and 7 wt % of butyl carbitol were kneaded to make a paste.

Next, green sheets of thicknesses of 4.5 $\mu$m and 15 $\mu$m were formed on PET films using the doctor brade casting method, the internal electrode paste was printed on the sheets, then the green sheets were peeled off from the PET films. Next, a plurality of green sheets obtained in this way were stacked and pressed to obtain a green chip. Four green sheets having internal electrodes were stacked.

Next, the green chip was cut to a predetermined size and was processed to remove the binder, sintered, and annealed to obtain the stacked ceramic sintered body.

The processing for removing the binder was performed under conditions of a rate of temperature rise of 15° C./hour, a holding temperature of 280° C., a holding time of 8 hours, and an air atmosphere. Further, the sintering was performed under conditions of a rate of temperature rise of 200° C./hour, a holding temperature of 1380° C., a holding time of 2 hours, a cooling rate of 300° C./hour, and a mixed gas atmosphere ($1\times10^{-5}$ atm) of wet nitrogen gas and hydrogen gas. The annealing was performed under conditions of a holding temperature of 900° C., a holding time of 9 hours, a cooling rate of 300° C./hour, and a wet nitrogen gas atmosphere ($1\times10^{-5}$ atm). Note that the atmospheres were wet using a water and a water temperature of 35° C.

Next, the end faces of the stacked ceramic sintered body were polished by sandblasting, then external electrode paste was transferred to the end faces and the assembly was sintered in a wet nitrogen gas and hydrogen gas atmosphere at 800° C. for 10 minutes to form external electrodes and obtain samples of stacked ceramic capacitors (hereinafter also called capacitor samples). The samples were of a size of 3.2 mm×1.6 mm×0.6 mm. The thickness of the dielectric layer was 10 $\mu$m and 3 $\mu$m and the thickness of the internal electrodes was 2.0 $\mu$m.

The samples of the multilayer ceramic capacitors thus obtained were measured for the temperature-dependence of the capacity and tertiary harmonic distortion (THD).

Evaluation Items and Evaluation Methods

For the ceramic characteristics, the shrinkage during sintering and the ceramic density were calculated from the dimensions and mass of the disk-shaped samples obtained by forming and sintering disk shapes. The sintering ability was evaluated from the results.

Further, the disk-shaped samples were measured for the electrostatic capacity and dielectric loss (tanδ) under the conditions of 1 kHz and 1 Vrms using an LCR meter. The dielectric constant was calculated from the obtained electrostatic capacity, electrode dimensions, and thickness of the samples.

Figure 6:
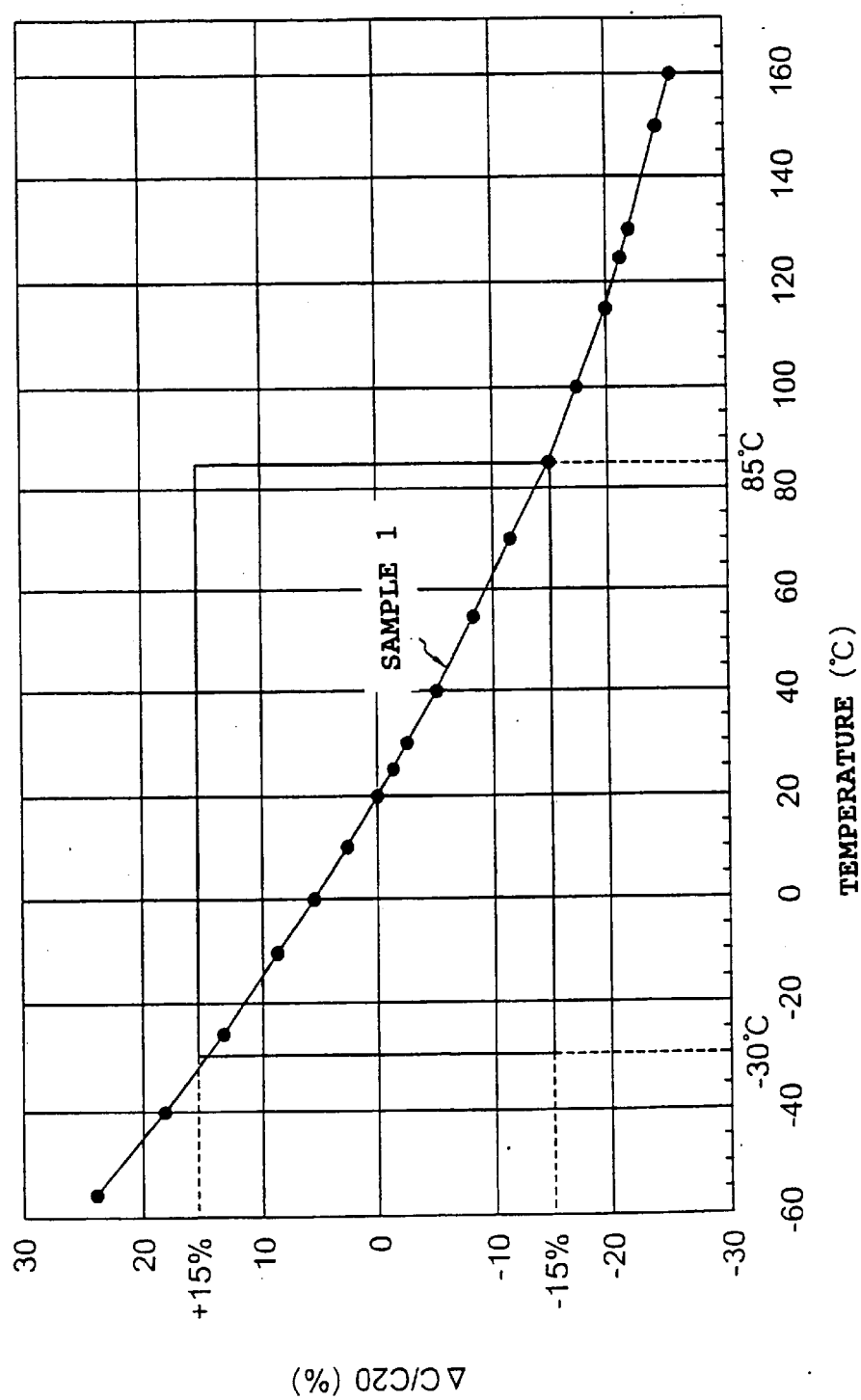
FIG. 6 is a graph of the temperature-dependence of the capacity (Y5R) in the examples.

For the temperature-dependence of the capacitance, the disk-shaped samples and capacitor samples were measured for the electrostatic capacity at a voltage of 1V in the temperature range of −30° C. to +85° C. using an LCR meter and it was investigated if the ratio of change of the capacity when the reference temperature was made 25° C. was within ±15% (Y5R characteristic of EIA standard of Electronic Industries Association of Japan). Samples satisfying this were graded as "good", while samples not satisfying this were graded as "poor". Further, the representative sample 1 satisfying this Y5R characteristic was measured for the rate of change of the capacity in the temperature range of −30° C. to +85° C. The results are shown in FIG. 6. A good temperature-dependence was exhibited.

The tertiary harmonic distortion (THD) of capacitor samples was measured in accordance with the procedure of the nonlinear measurement method of a fixed resistor of the standard EIAJ RC2111. For the measuring equipment, a CLT-1 made by RE TECNOLOGY AS was used. All of the capacitor samples were measured for the tertiary harmonic distortion when an AC voltage of 10 kHz was applied at a field intensity of 0.3 V/$\mu$F.

Ratios of Composition of Samples

The ratios of composition of calcium titanate (CT), strontium titanate (ST), and barium titanate (BT) and the amounts of the various additives added were changed as in Table 1 and Table 2 to fabricate the above disk-shaped samples and capacitor samples.

Figure 5:
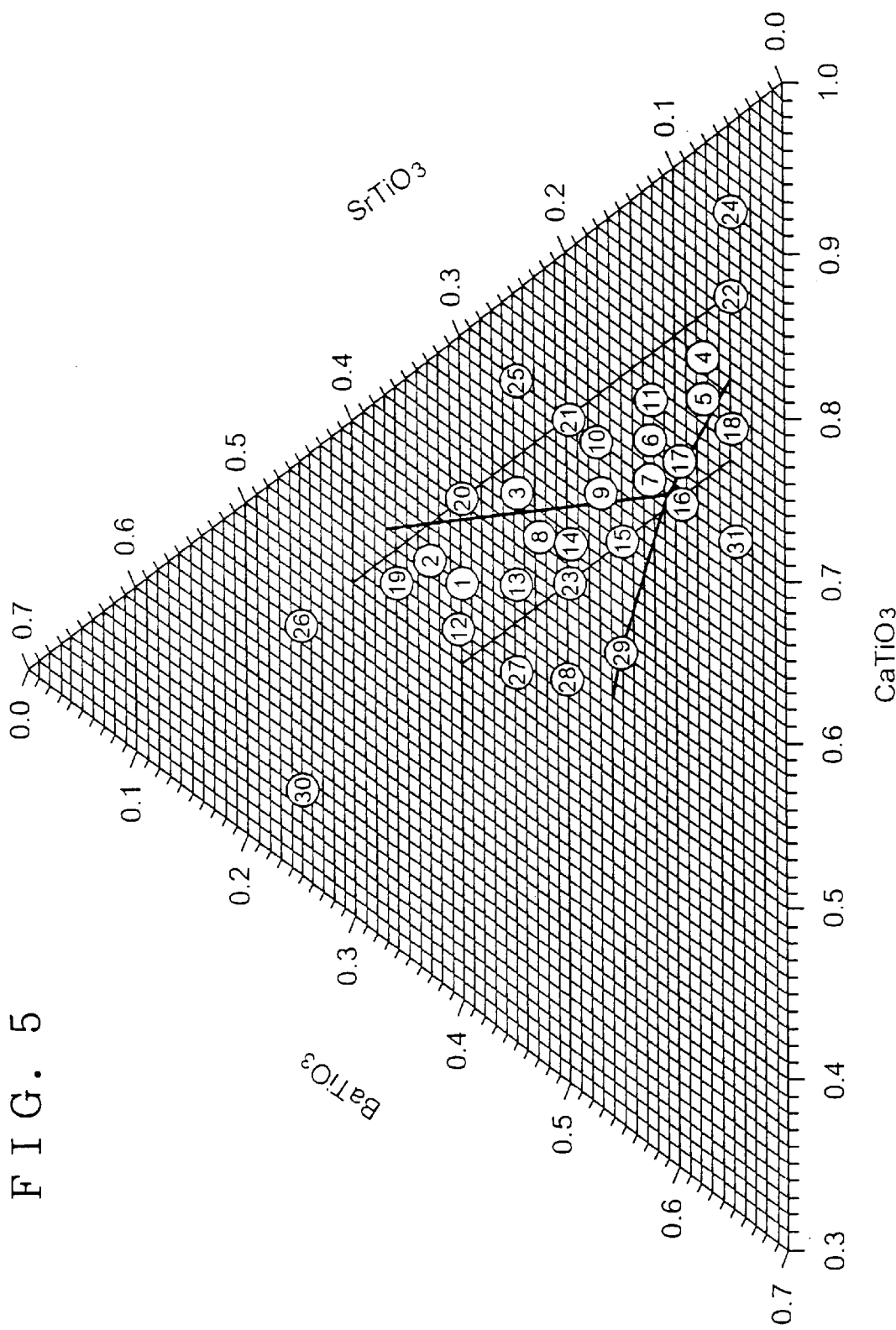
FIG. 5 is a view of the three-way composition showing the ratios of composition of samples 1 to 31 in the examples.

Table 1 shows examples where the MnO, $V_2O_5$, $SiO_2$, and other additives were fixed (specifically, to 0.5 mol % of MnO, 0.05 mol % of $V_2O_5$, and 0.2 mol % of $SiO_2$) and only the ratios of composition of the CT, ST, and BT were changed. Sample 1 to sample 26 are examples of the present invention, while sample 27 to sample 37 are comparative examples of the present invention. The sample numbers corresponding to the ratios of composition are shown in FIG. 5.

As opposed to this, Table 2 shows examples where the ratios of composition of the CT, ST, and BT were fixed (specifically, 0.6 mol % of CT, 0.25 mol % of ST, and 0.15 mol % of BT) and the types and amounts of the additives were changed. Sample 32 to sample 36 are examples of the present invention, while sample 37 to sample 41 are comparative examples of the present invention.

Further, to confirm the effectiveness of the sintering aid, the ratios of composition of the G group of $SiO_2$ and $Al_2O_3$, the M group of BaO, CaO, and SrO, and the L group of $Li_2O$, $Na_2O$, $K_2O_3$, and $B_2O_3$ were changed as shown in Table 3 to prepare the above stacked capacitor samples. Table 3 shows examples where the ratios of composition of the CT, ST, and BT and the amounts of the additives other than the sintering aid were fixed (specifically, 0.55 mol % of CT, 0.33 mol % of ST, 0.12 mol % of BT, 0.5 mol % of MnO, and 0.05 mol % of $V_2O_5$) and only the ratios of composition G, M, and L of the sintering aid were changed. Sample 42 to sample 55 are examples of the present invention, while sample 56 to sample 60 are comparative examples of the present invention. @

TABLE 1

| | CT | ST | BT | Dielectric constant | THD (dB) | Y5R- (%−) | tanδ (%) | IR (Ω cm) |
|---|---|---|---|---|---|---|---|---|
| Ex. | | | | | | | | |
| Sample 1 | 0.55 | 0.3 | 0.15 | 384 | −99 | −15 | 0.03 | 3.88E+12 |
| Sample 2 | 0.55 | 0.33 | 0.12 | 400 | −82 | −14 | 0.12 | 4.50E+12 |
| Sample 3 | 0.63 | 0.25 | 0.12 | 356 | −87 | −14 | 0.08 | 6.50E+12 |
| Sample 4 | 0.8 | 0.075 | 0.125 | 340 | −89 | −13 | 0.12 | 6.66E+12 |
| Sample 5 | 0.775 | 0.075 | 0.15 | 302 | −78 | −14 | 0.07 | 6.25E+12 |
| Sample 6 | 0.725 | 0.125 | 0.15 | 331 | −81 | −13 | 0.13 | 6.55E+12 |
| Sample 7 | 0.7 | 0.125 | 0.175 | 382 | −80 | −13 | 0.17 | 8.38E+12 |
| Sample 8 | 0.615 | 0.225 | 0.16 | 405 | −80 | −13 | 0.15 | 6.73E+12 |
| Sample 9 | 0.67 | 0.17 | 0.16 | 365 | −81 | −11 | 0.13 | 67.3E+12 |
| Sample 10 | 0.7 | 0.175 | 0.125 | 307 | −92 | −14 | 0.06 | 1.04E+12 |
| Sample 11 | 0.75 | 0.125 | 0.125 | 302 | −94 | −12 | 0.07 | 7.43E+12 |
| Sample 12 | 0.52 | 0.305 | 0.175 | 403 | −70 | −13 | 0.18 | 8.80E+12 |
| Sample 13 | 0.575 | 0.25 | 0.175 | 400 | −75 | −14 | 0.20 | 1.29E+12 |
| Sample 14 | 0.625 | 0.2 | 0.175 | 421 | −72 | −14 | 0.17 | 1.40E+12 |
| Sample 15 | 0.65 | 0.15 | 0.2 | 453 | −67 | −12 | 0.23 | 8.03E+12 |
| Sample 16 | 0.7 | 0.1 | 0.2 | 463 | −63 | −10 | 0.25 | 7.45E+12 |
| Sample 17 | 0.725 | 0.1 | 0.175 | 384 | −73 | −14 | 0.16 | 6.56E+1 |
| Sample 18 | 0.77 | 0.05 | 0.18 | 360 | −71 | −12 | 0.11 | 4.56E+12 |
| Sample 19 | 0.53 | 0.37 | 0.12 | 298 | −98 | −14 | 0.07 | 4.55E+12 |
| Sample 20 | 0.6 | 0.3 | 0.1 | 255 | −99 | −13 | 0.09 | 5.30E+12 |
| Sample 21 | 0.7 | 0.2 | 0.1 | 260 | −101 | −14 | 0.08 | 6.20E+12 |
| Sample 22 | 0.85 | 0.05 | 0.1 | 250 | −110 | −14 | 0.09 | 6.40E+12 |
| Sample 23 | 0.6 | 0.2 | 0.2 | 291 | −76 | −12 | 0.13 | 6.45E+12 |
| Sample 24 | 0.9 | 0.05 | 0.05 | 180 | −100 | −13 | 0.34 | 4.50E+12 |
| Sample 25 | 0.7 | 0.25 | 0.05 | 200 | −105 | −13 | 0.52 | 3.20E+12 |
| Sample 26 | 0.45 | 0.45 | 0.1 | 350 | −110 | −15 | 0.64 | 3.05E+12 |
| Cmp. Ex. | | | | | | | | |
| Sample 27 | 0.52 | 0.25 | 0.23 | 529 | −61 | −5 | 0.26 | 6.80E+12 |
| Sample 28 | 0.54 | 0.2 | 0.26 | 504 | −56 | +3 | 0.32 | 7.40E+12 |
| Sample 29 | 0.58 | 0.15 | 0.27 | 561 | −56 | +7 | 0.34 | 8.20E+12 |
| Sample 30 | 0.35 | 0.45 | 0.2 | 462 | −70 | −21 | 0.40 | 8.10E+12 |
| Sample 31 | 0.7 | 0.05 | 0.25 | 400 | −58 | +6 | 2.80 | 3.15E+12 |

Samples 1 to 31 contain, as additives, 0.5 mol % of MnO, 0.05 mol % of $V_2O_5$, and 0.2 mol % of $SiO_2$.

TABLE 2

| | MnO | $V_2O_5$ | $SiO_2$ | Dielectric constant | THD (dB) | Y5R (%) | tanδ (%) | IR (Ω cm) |
|---|---|---|---|---|---|---|---|---|
| Ex. | | | | | | | | |
| Sample 32 | 0.1 | 0.05 | 0.2 | 341 | −82 | −15 | 0.13 | 7.74E+12 |
| Sample 33 | 1 | 0.05 | 0.2 | 355 | −81 | −15 | 1.83 | 3.76E+11 |
| Sample 34 | 0.5 | 0.05 | 0.2 | 344 | −81 | −15 | 0.14 | 8.56E+12 |
| Sample 35 | 0.5 | 0.05 | 1 | 390 | −93 | −15 | 0.03 | 1.12E+13 |
| Sample 36 | 0.5 | 0.2 | 0.2 | 362 | −81 | −14 | 0.20 | 4.20E+12 |
| Cmp. Ex. | | | | | | | | |
| Sample 37 | 2 | 0.05 | 0.2 | 361 | −78 | −14 | 2.24 | 8.89E+10 |
| Sample 38 | 0.5 | 0.05 | 0.1 | 311 | −71 | −17 | 1.12 | 4.95E+10 |
| Sample 39 | 0.5 | 0.05 | 2 | 422 | −98 | −17 | 2.24 | 5.92E+10 |
| Sample 40 | 0.5 | 0.01 | 0.2 | 312 | −73 | −12 | 1.34 | 1.29E+10 |
| Sample 41 | 0.5 | 0.3 | 0.2 | 382 | −78 | −13 | 0.34 | 3.42E+10 |

Samples 32 to 41 all are comprised of 0.6 mol % of CT, 0.25 mol % of ST, and 0.15 mol % of BT.

TABLE 3

| | G Group | | M group | | | L group | | Glass component (mol %) | Firing temp. (° C.) | Dielectric constant | THD (dB) | Y5R (%) | tanδ (%) | IR (Ω cm) | Insulation breakage voltage (V) |
|---|---|---|---|---|---|---|---|---|---|---|---|---|---|---|---|
| | $SiO_2$ | $Al_2O_3$ | CaO | SrO | BaO | $Li_2O$ | $B_2O_3$ | | | | | | | | |
| Ex. | | | | | | | | | | | | | | | |
| Sample 42 | 0 | 0 | 0 | 0 | 0 | 1 | 0 | 0.5 | 1200 | 420 | −82 | −14.8 | 0.12 | 6.80E+12 | 684 |
| Sample 43 | 0 | 0 | 0.28 | 0.165 | 0.06 | 0.5 | 0 | 0.5 | 1280 | 410 | −79 | −13.2 | 0.18 | 3.20E+12 | 480 |
| Sample 44 | 0.1 | 0 | 0.36 | 0.215 | 0.08 | 0.25 | 0 | 0.5 | 1280 | 403 | −80 | −13.3 | 0.15 | 3.30E+12 | 475 |
| Sample 45 | 0.5 | 0 | 0 | 0 | 0 | 0.5 | 0 | 0.5 | 1200 | 405 | −81 | −14.3 | 0.16 | 6.60E+12 | 587 |
| Sample 46 | 0.65 | 0 | 0.06 | 0.033 | 0.01 | 0.25 | 0 | 0.5 | 1280 | 389 | −78 | −14.0 | 0.19 | 4.10E+12 | 490 |
| Sample 47 | 0 | 0 | 0.11 | 0.066 | 0.02 | 0.8 | 0 | 0.5 | 1200 | 400 | −81 | −14.1 | 0.13 | 6.90E+12 | 691 |
| Sample 48 | 0.2 | 0 | 0 | 0 | 0 | 0.8 | 0 | 0.5 | 1200 | 411 | −80 | −14.0 | 0.15 | 6.80E+12 | 652 |
| Sample 49 | 0.4 | 0 | 0.11 | 0.066 | 0.02 | 0.4 | 0 | 0.5 | 1220 | 409 | −80 | −14.6 | 0.15 | 4.80E+12 | 659 |
| Sample 50 | 0.3 | 0 | 0.17 | 0.099 | 0.04 | 0.4 | 0 | 0.5 | 1220 | 408 | −81 | −14.2 | 0.14 | 5.60E+12 | 655 |
| Sample 51 | 0.2 | 0 | 0.17 | 0.099 | 0.04 | 0.5 | 0 | 0.5 | 1220 | 400 | −80 | −15.4 | 0.13 | 6.10E+12 | 638 |
| Sample 52 | 0.3 | 0 | 0.22 | 0.149 | 0.05 | 0.3 | 0 | 0.5 | 1220 | 393 | −80 | −14.2 | 0.13 | 4.70E+12 | 615 |
| Sample 53 | 0.3 | 0 | 0.25 | 0.149 | 0.05 | 0.25 | 0 | 0.5 | 1280 | 370 | −79 | −13.5 | 0.20 | 4.40E+12 | 555 |
| Sample 54 | 0 | 0.05 | 0.06 | 0.033 | 0.01 | 0.85 | 0 | 0.5 | 1200 | 400 | −79 | −14.0 | 0.19 | 4.10E+12 | 505 |
| Sample 55 | 0.3 | 0 | 0.17 | 0.099 | 0.04 | 0 | 0.4 | 0.5 | 1200 | 403 | −81 | −14.3 | 0.18 | 5.50E+12 | 531 |
| Cmp. Ex. | | | | | | | | | | | | | | | |
| Sample 56 | 0.8 | 0 | 0.06 | 0.33 | 0.01 | 0.1 | 0 | 0.5 | 1280 | — | — | — | — | — | — |
| Sample 57 | 0.4 | 0 | 0.3 | 0.182 | 0.07 | 0.05 | 0 | 0.5 | 1280 | — | — | — | — | — | — |
| Sample 58 | 0.1 | 0 | 0.44 | 0.264 | 0.1 | 0.1 | 0 | 0.5 | 1280 | — | — | — | — | — | — |
| Sample 59 | 0.05 | 0 | 0 | 0 | 0 | 0 | 0 | 0.05 | 1280 | — | — | — | — | — | — |
| Sample 60 | 0.05 | 0 | 0 | 0 | 0 | 0 | 0 | 0.05 | 1340 | 410 | −80 | −13.6 | 0.22 | 3.50E+12 | 489 |

Samples 42 to 60 are all comprised of 0.55 mol % of CT, 0.33 mol % of ST, 0.12 mol % of BT, 0.5 mol % of MnO, and 0.05 mol % of $V_2O_5$. The values of the G group, M group, and L group are the molar ratio of composition of the glass component (G + M + L = 1). Samples 56 to 59 were not able to give dense sintered bodies.

CONSIDERATIONS (1) The above results are shown in Table 1 to Table 3. In the table, in the figures for the insulation resistance IR, "mE+n" means "m×10$^{+n}$". Note that regarding the results of evaluation of the fireability, while not shown in these tables, in the results of Table 1 and Table 2, there was no problem at all for the samples other than sample 38. For sample 38, however, since the amount of $SiO_2$ added was small, the sintering ability was poor and the strength insufficient.

From the results of Table 1, first, the balance of the dielectric constant, distortion factor, and temperature-dependence of the capacity was best in sample 1 to sample 11. After these, sample 12 to sample 18 had a somewhat larger tertiary harmonic distortion THD compared with sample 1 to sample 11, but were extremely good in other characteristics. Further, sample 19 to sample 22 were somewhat lower in dielectric constant compared with sample 1 to sample 11, but were extremely good in other characteristics.

As opposed to this, sample 27 to sample 29 of the comparative examples have large dielectric constants, but the tertiary harmonic distortion THD remarkably deteriorates. Further, sample 30 does not satisfy the temperature-dependence of the capacity Y5R, while the sample 31 has a remarkably large dielectric loss tan δ.

Further, the following can be understood about the additives from the results of Table 2. First, from a comparison of samples 32 and 33 and sample 37, it is learned that if the amount of MnO added is too great, both of the dielectric loss tans and insulation resistance IR deteriorate.

Further, from a comparison of samples 34 and 35 and samples 38 and 39, it is learned that both if the amount of $SiO_2$ added is increased or decreased, both of the dielectric loss tan δ and insulation resistance IR deteriorate.

Further, from a comparison of samples 35 and 36 and samples 40 and 41, it is learned that if the amount of $V_2O_5$ added is reduced, both of the dielectric loss tan δ and insulation resistance IR deteriorate.

Note that CrO was added instead of MnO or $Al_2O_3$ was added instead of $SiO_2$ and the results evaluated under the same conditions as the above, but the same results were obtained in both cases. Further, $MoO_3$, $WO_3$, and $CO_3O_4$ were added respectively instead of $V_2O_5$ or $mNb_2O_5$, $Ta_2O_5$, $Y_2O_3$, $La_2O_3$, $CeO_2$, $Gd2O_3$, $Dy_2O_3$, and $Ho_2O_3$ were added as other additives and the results evaluated under the same conditions as the above, but the same results were obtained in all cases.

Figure 7:
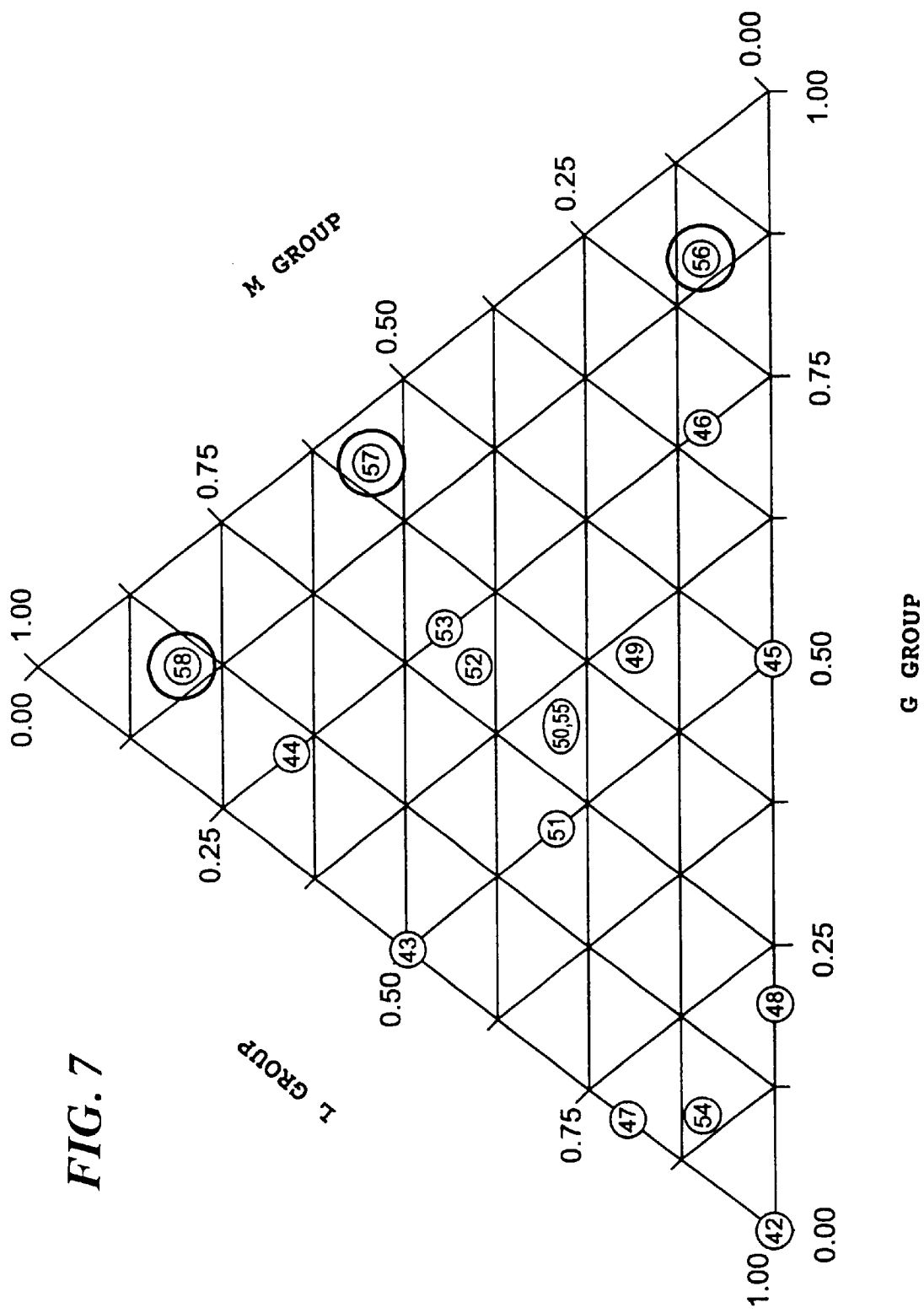
FIG. 7 is a triangular diagram of the ratios of composition of samples 42 to 60 in the examples.

(2) Further, regarding the results of Table 3, in the triangular diagram shown in FIG. 7, the samples in the area surrounded by the samples 42, 47, 43, 44, 53, 46, 45, and 48, more preferably, the area surrounded by the samples 42, 47, 52, 49, 45, and 48, are good in all characteristics. Note that the samples 56 to 59 of the comparative examples could not give dense sintered bodies even if sintered.

Note that the examples explained above were given for facilitating the understanding of the present invention and were not given for limiting the present invention. Therefore, the elements disclosed in the above examples include all design modifications and equivalents belonging to the technical scope of the present invention.

What is claimed:

1. A dielectric composition containing at least calcium titanate, strontium titanate, and barium titanate, wherein
   in the three molar ratios of composition, at least the molar ratio of composition of the barium titanate is not more than 0.3 and
   at least one crystal structure of tetragonal crystal and orthorhombic crystal structures is contained.

2. A dielectric composition as set forth in claim 1, wherein the rate of change of electrostatic capacity with respect to temperature is within ±15% at least in a temperature range of −30° C. to +85° C. (reference temperature of 25° C.).

3. A dielectric composition as set forth in claim 1, further containing a reduction resistance aid.

4. A dielectric composition as set forth in claim 1, further containing a sintering aid.

5. A dielectric composition as set forth in claim 4, wherein said sintering aid is at least one type of glass composition selected from the following G group, M group, and L group:

G group: $SiO_2$ and $Al_2O_3$
M group: BaO, CaO, and SrO
L group: $Li_2O$, $Na_2O$, $K_2O$, and $B_2O_3$.

6. A dielectric composition as set forth in claim 5, wherein when the ratios of composition of the G group, M group, and L group are expressed by a triangular diagram (G, M, and L), the ratio of composition of the sintering aid is in the area surrounded by the following points X1 to X5 (including on lines):

X1: (0.0, 0.0, 1.0)
X2: (0.0, 0.5, 0.5)
X3: (0.1, 0.65, 0.25)
X4: (0.5, 0.0, 0.5)
X5: (0.65, 0.05, 0.3).

7. A dielectric composition as set forth in claim 5, wherein when the ratios of composition of the G group, M group, and L group are expressed by a triangular diagram (G, M, and L), the ratio of composition of the sintering aid is in the area surrounded by the following points X1, X6, X7, and X5 (including on lines):

X1: (0.0, 0.0, 1.0)
X6: (0.0, 0.2, 0.8)
X7: (0.3, 0.4, 0.3)
X5: (0.5, 0.0, 0.5).

8. A dielectric composition as set forth in claim 4, containing 0.2 mol % to 5 mol % of said sintering aid.

9. A dielectric composition as set forth in claim 1, further containing at least one oxide selected from $V_2O_5$, $MoO_3$, $WO_3$, and $Co_8O_4$.

10. A dielectric composition as set forth in claim 1, further containing at least one oxide selected from $Nb_2O_5$, $Ta_2O_5$, $Y_2O_3$, $La_2O_3$, $CeO_2$, $Gd_2O_3$, $Dy_2O_3$, and $Ho_2O_3$.

11. A ceramic capacitor having an internal electrode and a dielectric layer, wherein the dielectric layer is comprised of a composition as set forth in claim 1.

12. A ceramic capacitor as set forth in claim 11, wherein the internal electrode is comprised of Ni or an Ni alloy.

13. A dielectric composition containing at least calcium titanate, strontium titanate, and barium titanate, where at least the three molar ratios of composition of these are such that the molar ratio of composition (P) of calcium titanate is 0.5 to 0.85, the molar ratio of composition (Q) of strontium titanate is 0.05 to 0.4, and the molar ratio of composition (R) of barium titanate is 0.1 to 0.2, however, P+Q+R=1.

14. A dielectric composition as set forth in claim 13, including at least one crystal structure of tetragonal crystal and orthorhombic crystal structures.

15. A dielectric composition as set forth in claim 13, wherein the rate of change of electrostatic capacity with respect to temperature is within ±15% at least in a temperature range of −30° C. to +85° C. (reference temperature of 25° C.).

16. A dielectric composition as set forth in claim 13, further containing a reduction resistance aid.

17. A dielectric composition as set forth in claim 13, further containing a sintering aid.

18. A dielectric composition as set forth in claim 17, wherein said sintering aid is at least one type of glass composition selected from the following G group, M group, and L group:

G group: $SiO_2$ and $Al_2O_3$
M group: BaO, CaO, and SrO
L group: $Li_2O$, $Na_2O$, $K_2O$, and $B_2O_3$.

19. A dielectric composition as set forth in claim 18, wherein when the ratios of composition of the G group, M group, and L group are expressed by a triangular diagram (G, M, and L), the ratio of composition of the sintering aid is in the area surrounded by the following points X1 to X5 (including on lines):

X1: (0.0, 0.0, 1.0)
X2: (0.0, 0.5, 0.5)
X3: (0.1, 0.65, 0.25)
X4: (0.5, 0.0, 0.5)
X5: (0.65, 0.05, 0.3).

20. A dielectric composition as set forth in claim 18, wherein when the ratios of composition of the G group, M group, and L group are expressed by a triangular diagram (G, M, and L), the ratio of composition of the sintering aid is in the area surrounded by the following points X1, X6, X7, and X5 (including on lines):

X1: (0.0, 0.0, 1.0)
X6: (0.0, 0.2, 0.8)
X7: (0.3, 0.4, 0.3)
X5: (0.5, 0.0, 0.5).

21. A dielectric composition as set forth in claim 17, containing 0.2 mol % to 5 mol % of said sintering aid.

22. A dielectric composition as set forth in claim 13, further containing at least one oxide selected from $V_2O_5$, $MoO_3$, $WO_3$, and $Co_8O_4$.

23. A dielectric composition as set forth in claim 13, further containing at least one oxide selected from $Nb_2O_5$, $Ta_2O_5$, $Y_2O_3$, $La_2O_3$, $CeO_2$, $Gd_2O_3$, $Dy_2O_3$, and $Ho_2O_3$.

24. A ceramic capacitor having an internal electrode and a dielectric layer, wherein the dielectric layer is comprised of a composition as set forth in claim 13.

25. A ceramic capacitor as set forth in claim 24, wherein the internal electrode is comprised of Ni or an Ni alloy.

* * * * *